United States Patent [19]

Takeda et al.

[11] Patent Number: 5,699,134
[45] Date of Patent: Dec. 16, 1997

[54] LIQUID CRYSTAL DISPLAY PANEL AND METHOD FOR MANUFACTURING THE PANEL

[75] Inventors: Mamoru Takeda, Hirakata; Ikunori Kobayashi, Sakai; Mitsuhiro Uno, Neyagawa, all of Japan

[73] Assignee: Matsushita Electric Industrial Co. Ltd., Osaka, Japan

[21] Appl. No.: 343,936

[22] Filed: Nov. 17, 1994

[30] Foreign Application Priority Data

Nov. 17, 1993 [JP] Japan ................. HEI 5-288508

[51] Int. Cl.$^6$ ................. G02F 1/1333; G02F 1/136
[52] U.S. Cl. ................. 349/40; 349/42
[58] Field of Search ................. 359/59, 60, 54; 349/42, 50, 14, 40

[56] References Cited

U.S. PATENT DOCUMENTS

| | | | |
|---|---|---|---|
| 4,807,973 | 2/1989 | Kawasaki | 359/59 |
| 4,820,650 | 4/1989 | Nagae et al. | 437/10 |
| 4,974,375 | 12/1990 | Tada et al. | 51/413 |
| 5,068,748 | 11/1991 | Ukai et al. | 359/59 |
| 5,146,301 | 9/1992 | Yamamura et al. | 357/23.7 |
| 5,170,235 | 12/1992 | Tanino | 257/156 |
| 5,233,448 | 8/1993 | Wu | 359/59 |
| 5,285,301 | 2/1994 | Shirahashi et al. | 359/59 |
| 5,313,319 | 5/1994 | Salisbury | 359/60 |
| 5,323,254 | 6/1994 | Pitt | 359/60 |
| 5,353,142 | 10/1994 | Dodd | 359/54 |
| 5,358,590 | 10/1994 | Yamanaka | 156/247 |
| 5,373,377 | 12/1994 | Ogawa et al. | 359/59 |
| 5,410,423 | 4/1995 | Furushima et al. | 359/62 |

FOREIGN PATENT DOCUMENTS

| | | | |
|---|---|---|---|
| 6-202151 | 7/1994 | Japan | 359/59 |

OTHER PUBLICATIONS

*Patent Abstracts of Japan*, vol. 12, No. 499 (P-807), dated 27 Dec. 1988, and JP-A-63 208023 to Alps Electric Co., Ltd. dated 29 Aug. 1988.
*Patent Abstracts of Japan*, vol. 14, No. 474 (P-1117), dated 16 Oct. 1990, and JP-A-02 190820 to Mitsubishi Electric Corp. dated 26 Jul. 1990.
*Patent Abstracts of Japan*, vol. 11, No. 164 (P-580), dated 27 May 1987, and JP-A-61 296330 to Citizen Watch Co., Ltd. dated 27 Dec. 1986.

*Primary Examiner*—William L. Sikes
*Assistant Examiner*—Toan Ton
*Attorney, Agent, or Firm*—Beveridge, DeGrandi, Weilacher & Young, L.L.P.

[57] ABSTRACT

A liquid crystal display (LCD) panel includes a short-circuit ring formed of aluminum or an aluminum alloy during manufacture. The short-circuit ring is formed along a gate wiring line or a source wiring line. After the panel is inspected for defects, the short-circuit ring is removed. In the LCD manufacturing process, a glass substrate is cut outside the short-circuit ring made of aluminum, and thereafter the short-circuit ring is removed by grinding the short-circuit ring while spraying water having a low resistance on the substrate. The water may include carbon dioxide gas. Low resistance aluminum may be used as the gate wiring line and the short-circuit ring. This aluminum material, which is used as a current supply wiring line, can be subjected to an anodic oxidation process. Thus, it is not necessary to form a film of any metal other than aluminum. This can simplify or reduce the number of fabrication processes. Furthermore, because the aluminum is trimmed off by grinding, it is not clawed during cutting. In this manner, the aluminum short-circuit material is removed without causing short circuits between adjacent wiring lines and without slipping the tooth when scribing a scratch marking line by a scriber.

3 Claims, 3 Drawing Sheets

LIQUID CRYSTAL DISPLAY PANEL AND METHOD FOR MANUFACTURING THE PANEL

BACKGROUND OF THE INVENTION

1. Field of the Invention

The present invention relates to a method for separating a short-circuit ring which connects gate wiring lines or drain wiring lines of an array substrate in a manufacturing process for forming a liquid crystal display TFT array substrate into a panel.

2. Description of the Prior Art

A liquid crystal display has been regarded as a very important display device for use in an information terminal of office automation, and accordingly, there has been a rapid promotion of developing high-definition large-size liquid crystal display screens on the order of ten inches. Under the above-mentioned circumstances, there has been much effort taken in producing defect-free liquid crystal display panels employing active elements, in particular, a thin film transistor (referred to as a "TFT" hereinafter).

However, since the TFT element is a field-effect transistor, a defective TFT is possibly produced due to electrostatic charges generated in the manufacturing process. Therefore, sufficient care or consideration is required.

For the above-mentioned reasons, a short-circuit ring made of a Cr material, a Ta material, or an ITO material has been formed around the TFT array substrate, and after filling liquid crystals for the formation of a display panel, the above-mentioned short-circuit ring has been removed (Japanese Patent Laid-Open Publication No. SHO 63-180935).

In a removing process, a scratch marking line is formed on a glass substrate by means of a scriber or the like, and thereafter the short-circuit ring has been separated by cutting.

Since the aforementioned Cr material, Ta material, and ITO material are hard materials, they can be easily cut off.

In more detail, when the gate wiring line or the source and drain wiring lines are made of a soft material such as Al, only the material of the short-circuit ring formed in the peripheral portion is changed into a material such as Cr, so that the short-circuit ring can be easily cut off.

However, in the current situation wherein large-size TFT array panels are produced, the gate scanning electrode is required to have a reduced resistance, and therefore a material including Al has been increasingly used as a gate wiring metal.

In order to reduce the defect, there has been put in practice a system for forming an insulating film by subjecting the gate electrode made of Al, Ta, or the like to an anodic oxidation process.

It is to be noted that only the short-circuit ring is formed of a material of Cr, Ta, or the like different from the material of Al.

Thus, when the short-circuit ring is formed of a material different from the Al based material used for the gate wiring line or the source and drain wiring lines, a process of forming the different material and a patterning process therefor are further required.

When the short-circuit ring is formed of the same material of Al as that used for the gate or source and drain wiring lines and the cutting is effected at a wire lead portion inside the short-circuit ring by dicing or similar means, since the wiring material of Al is soft, the material of Al is clawed to possibly cause short circuit between adjacent wiring lines.

Furthermore, when the tooth of the dicing is made to run on the wiring line made of Al, the tooth tends to slip, resulting in a difficult cutting operation.

SUMMARY OF THE INVENTION

In order to solve the aforementioned problems, it is an object of the present invention to provide a method for easily removing a short-circuit ring made of Al after forming a liquid crystal display panel.

The present invention takes the measures of preparatorily cutting a glass substrate in a portion where no wiring line exists outside the short-circuit ring made of Al by a dicing or a similar means, and thereafter trimming off the short-circuit ring in a grinding stage of a glass chamfering process.

By taking the above-mentioned measures, even the soft wiring material of Al can be easily removed.

By introducing the above-mentioned processes, the present invention is capable of easily removing the short-circuit ring, made of Al of the TFT array substrate. The above-mentioned arrangement produces the advantages of causing no short circuit between adjacent wiring lines made of Al by the dicing and reducing the number of processes in comparison with the conventional case.

Furthermore, by virtue of an advantage that the material of Al used for the gate or source and drain wiring lines can be utilized as a short-circuit ring as it is, there is no need to provide the processes of forming a film of another metal material and patterning the same.

With the above-mentioned arrangement, the processes can be simplified or reduced, and when small-size TFT array substrates are segmented from a large-size TFT array substrate, the short-circuit ring made of Al can be fully utilized merely through the conventional processes.

Furthermore, when the gate electrode made of Al is subjected-to an anodic oxidation process, there is an advantage that a wiring line provided as a power supply line for the anodic oxidation process can be utilized as a short-circuit ring as it is.

DETAILED DESCRIPTION OF THE PREFERRED EMBODIMENT

An embodiment of the present invention will be described in detail with reference to the accompanying drawings.

Figure 1:
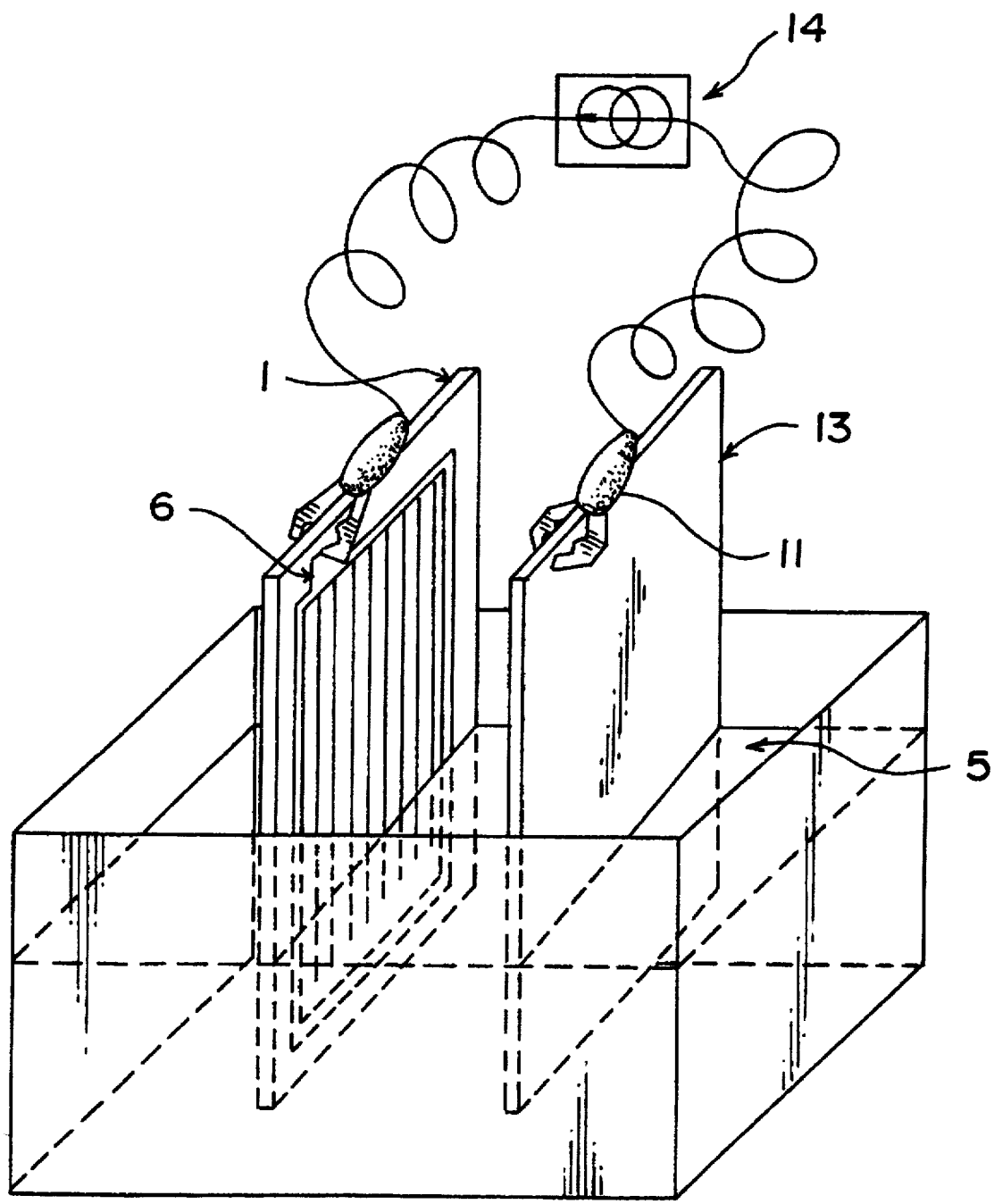
FIG. 1 is an explanatory view of an embodiment of the present invention, in which an anodic oxidation process is performed by commonly using a gate wiring material of Al and an anodic oxidation power supply wiring material of Al.
Figure 2A:
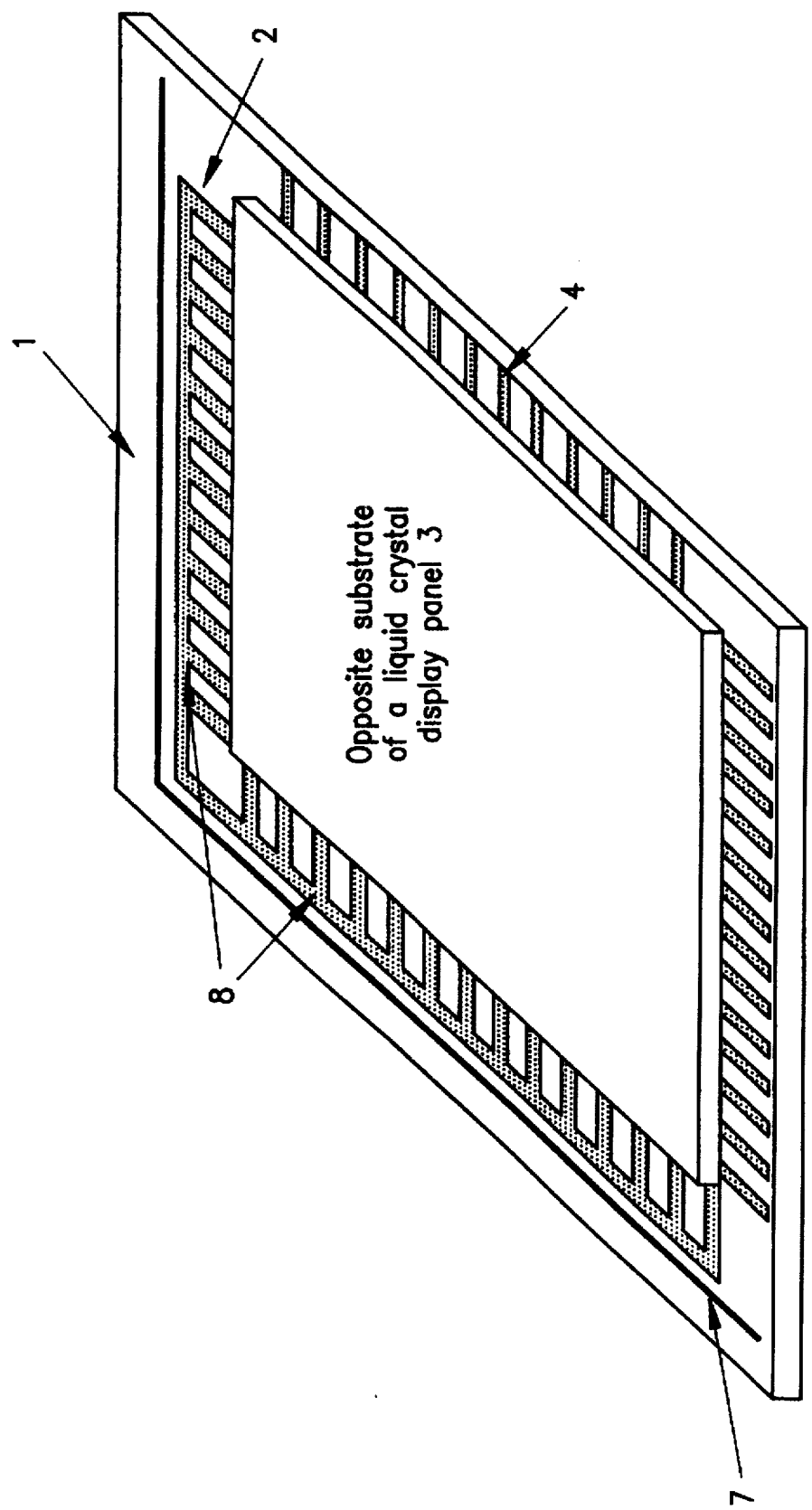
FIGS. 2 (a) and 2 (b) are simplified explanatory views of processes of removing a short-circuit ring made of Al on a TFT array of the embodiment of the present invention.
Figure 2B:
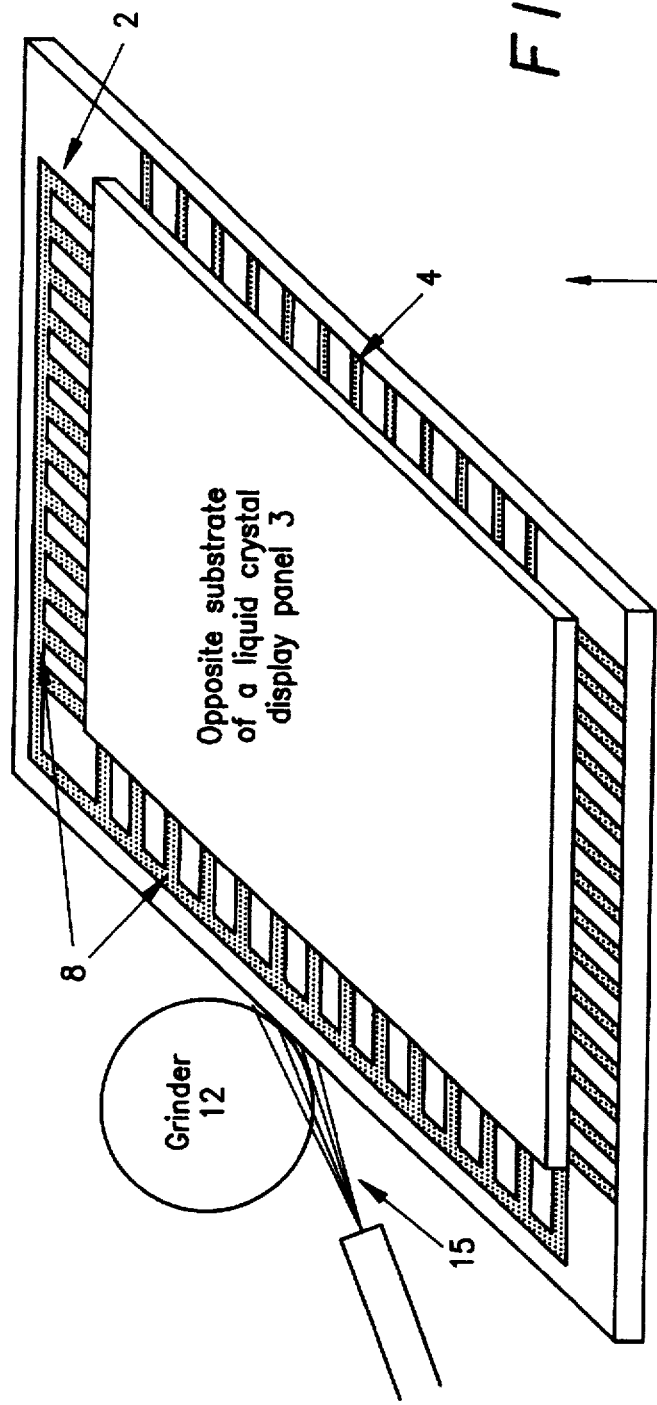

Referring to FIGS. 1, 2 (a), and 2 (b), there are shown a TFT array substrate 1, a gate wiring line 2, an opposite substrate 3 of a liquid crystal display panel, a source wiring line 4, an anodic oxidation solution 5, a current supply wiring line 6 formed on the array substrate for forming an anodic oxidation film, a center line 7 of cutting by means of a dicing or a scriber, a short-circuit ring Al wiring line 8, an anodic oxidation current supply clip 11, a grinder 12, an anodic oxidation opposite substrate 13, an anodic oxidation constant current source 14, and water 15 having a low resistance.

Referring to FIG. 1, a TFT array substrate on which the gate wiring line and the anodic oxidation current supply wiring line 6 are formed of Al or a material including Al are immersed in the anodic oxidation solution 5 to be subjected to an anodic oxidation process.

Figure 3:
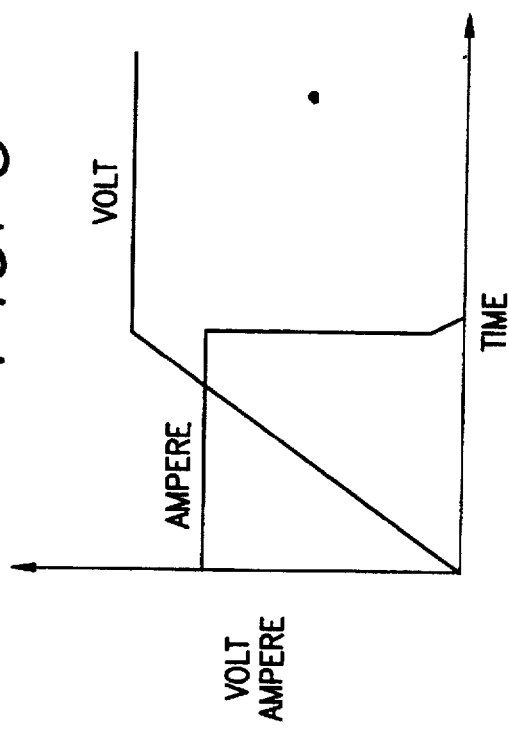
FIG. 3 is a graph showing a volt-ampere characteristic of the anodic oxidation process.

The anodic oxidation process is performed under volt-ampere characteristic conditions as shown in FIG. 3.

In the case of the material of Al, the anodic oxidation solution 5 is implemented by tartaric acid or citric acid.

When growing an anodic oxidation film by 2000 Å, a voltage of about 100 V is applied. The application of the voltage is performed by using the current supply material of Al as the short-circuit ring 8, while the gate wiring lines 2 or the source wiring lines 4 are mutually connected in a manner as shown in FIGS. 2 (a) and 2 (b).

When the short-circuit ring is made to concurrently serve as an electrode for inspecting the display, the short-circuit ring for the source wiring lines 4 and the short-circuit ring for the gate wiring lines 2 are separated to be able to independently supply signals.

The electrode substrate 13 that the clip 11 grips is to be removed by etching or in a similar manner in an array forming process after the anodic oxidation process is completed.

Therefore, after the panel filled with the liquid crystals is completed, the short-circuit ring remains in the peripheral portion.

In regard to the image display of the liquid crystal display panel, when the short-circuit ring of the gate wiring line and the short-circuit ring of the source wiring line are separated from each other, an inspection of defects is performed by inputting a signal to each of the short-circuit rings to effect a simultaneous image display on the entire panel screen.

Subsequently, the substrate is subjected to a short-circuit ring removing process.

According to the conventional system, it is required to scribe a scratch marking line inside the gate wiring line 2 and the source wiring line 4 and cut off the same. In such a case, since a wiring line made of Al is employed, when the scratch marking line is scribed at the wire lead portion made of Al, the material of Al is clawed to possibly cause short circuit between adjacent wiring lines.

Therefore, according to the present invention, only the glass substrate is first cut off outside the short-circuit ring formed of the wiring line made of Al.

In the above stage, a distance between the center of the dicing tooth or the center line 7 along which the glass substrate is to be cut by means of a diamond cutter of the scriber and the outer end of the short-circuit ring is designed to be greater than a half of the thickness of the dicing teeth.

The above-mentioned arrangement is to prevent the short-circuit ring from being scratched in the scratch marking line scribing process by means of the scriber.

Since the thickness of the dicing teeth is normally about 200 μm, the center line 7 is designed to be separated by 100 μm apart from the end of the short-circuit ring made of Al.

Furthermore, since the chamfering of the glass substrate in a subsequent process is about 200 μm to 500 μm, the width of the short-circuit ring is designed so that the distance between the center line 7 of cutting and the inner end of the short-circuit ring is 500 μm.

When removing the short-circuit ring made of Al from the liquid crystal display panel having the TFT array substrate designed as described above, first the glass substrate is cut to have a specified size by the dicing.

Otherwise, it is acceptable to scribe a scratch marking line by means of the scriber and thereafter cut the glass substrate by striking the substrate end.

In the above-mentioned stage, electrostatic charges tend to take place because the glass substrate is rubbed in the process of dicing.

Therefore, the cutting or the scribing of the scratch marking line is performed by spraying on the substrate a water having a low resistance including $CO_2$.

According to an experiment, a dielectric breakdown of the TFT array has occurred without spraying on the substrate the water having a low resistance, and it is also confirmed that such a trouble can be avoided by spraying the water on the substrate.

Then, as shown in FIG. 2 (b), the edge portion of the glass substrate cut in the grinding process is then chamfered.

In the above stage, the short-circuit ring is ground off simultaneously with the chamfering.

In performing the chamfering process, the grinding is also effected while spraying on the substrate the water having a low resistance in order to prevent the electrostatic charges from taking place.

By removing the short-circuit ring of the array designed as described above through the aforementioned processes, even in the case of an array substrate employing a short-circuit ring made of Al or an Al alloy, the removal of the short-circuit ring can be easily achieved.

What is claimed is:

1. A liquid crystal display panel, comprising:
   a substrate having at least one thin film transistor array for a liquid crystal display;
   a plurality of gate wiring lines formed on said substrate;
   a plurality of drain wiring lines formed on said substrate;
   a short-circuit ring made of a material including aluminum, wherein the short-circuit ring is directly connected to either said gate wiring lines or said drain wiring lines; and
   a current supply wiring line for subjecting the gate wiring line to an anodic oxidation process, wherein said short-circuit ring is used together with said current supply wiring line.

2. A method for manufacturing a liquid crystal display panel having a liquid crystal display thin film transistor array substrate in which a short-circuit ring for connecting gate wiring lines or drain wiring lines is made of a material including aluminum, comprising the step of:
   cutting a glass material of the substrate while making a distance between an outer end line of the short-circuit ring and a center line of cutting of the substrate greater than one half of a thickness of a tooth for cutting the substrate.

3. A method of manufacturing a liquid crystal display panel including a substrate having at least one thin film transistor array, a plurality of gate wiring lines formed on the substrate, a plurality of drain wiring lines formed on the substrate, and a panel connected with the array on the substrate, the method comprising the steps of:
   filling liquid crystals into the panel on the substrate, wherein at least one short-circuit ring made of a material including aluminum is connected to either the gate wiring lines or the drain wiring lines on the liquid crystal display panel included on the substrate;

cutting the substrate; and removing the short-circuit ring from the cut substrate wherein a cut edge portion of the cut substrate is chamfered while water having a low resistance is poured on the substrate, wherein, said short-circuit ring is located between a center line for cutting the assembled substrate and a border line along the center line, and a distance between the center line and the border line is designed to be within 500 micrometers.

\* \* \* \* \*